United States Patent
Lutz (10) Patent No.: US 8,342,973 B2
(45) Date of Patent: Jan. 1, 2013

(54) SLIDING JOINT

(75) Inventor: Matthias Lutz, Tuebingen (DE)

(73) Assignees: Neumayer Tekfor Holding GmbH, Hausach (DE); Hofer PDC GmbH, Stuttgart (DE)

( * ) Notice: Subject to any disclaimer, the term of this patent is extended or adjusted under 35 U.S.C. 154(b) by 0 days.

(21) Appl. No.: 13/432,591

(22) Filed: Mar. 28, 2012

(65) Prior Publication Data

US 2012/0184381 A1 Jul. 19, 2012

Related U.S. Application Data

(63) Continuation of application No. PCT/DE2010/001147, filed on Sep. 29, 2010.

(30) Foreign Application Priority Data

Sep. 30, 2009 (DE) .......................... 10 2009 043 578

(51) Int. Cl.
*F16D 3/223* (2011.01)
(52) U.S. Cl. ........................................ 464/145; 464/906
(58) Field of Classification Search .................. 464/143, 464/145, 146, 906
See application file for complete search history.

(56) References Cited

U.S. PATENT DOCUMENTS

| | | | |
|---|---|---|---|
| 3,447,341 A * | 6/1969 | Miller, Jr. ................. | 464/145 X |
| 3,879,960 A * | 4/1975 | Welschof et al. ............ | 464/145 |
| 5,616,081 A * | 4/1997 | Krude et al. ................ | 464/145 |
| 6,241,615 B1 * | 6/2001 | Jacob ........................... | 464/145 |
| 7,396,284 B2 | 7/2008 | Jacob et al. | |
| 7,507,160 B2 * | 3/2009 | Maucher et al. ............. | 464/145 |
| 7,530,897 B2 | 5/2009 | Jacob et al. | |
| 7,621,816 B2 | 11/2009 | Weckerling et al. | |
| 7,686,695 B2 * | 3/2010 | Maucher et al. ............. | 464/145 |
| 7,708,645 B2 * | 5/2010 | Miller et al. ................. | 464/906 X |
| 7,736,239 B2 * | 6/2010 | Niederhufner et al. .... | 464/906 X |
| 7,806,772 B2 | 10/2010 | Frost et al. | |
| 8,070,613 B2 * | 12/2011 | Cermak ..................... | 464/145 X |
| 2001/0006910 A1 * | 7/2001 | Krude et al. ................. | 464/145 |
| 2004/0157669 A1 * | 8/2004 | Eryilmaz et al. ............. | 464/145 |
| 2007/0196129 A1 * | 8/2007 | Takigawa et al. | |
| 2008/0214317 A1 | 9/2008 | Weckerling et al. | |

FOREIGN PATENT DOCUMENTS

| | | |
|---|---|---|
| DE | 102 09 933 A1 | 10/2003 |
| DE | 102 37 169 A1 | 3/2004 |
| DE | 10 2005 042 909 A1 | 3/2007 |
| DE | 10 2007 010 352 A1 | 4/2008 |
| JP | 2007-40425 A | 2/2007 |
| WO | WO 2008/043334 A2 | 4/2008 |

\* cited by examiner

*Primary Examiner* — Gregory Binda
*Assistant Examiner* — Matthieu Setliff
(74) *Attorney, Agent, or Firm* — Crowell & Moring LLP (57) ABSTRACT

A sliding joint for motor vehicles, having an inner race which includes inner running grooves, an outer race which includes outer running grooves, a cage, and balls. The inner running grooves are constructed parallel to each other in the axial dimension and include a displacement segment and a functional segment, and the outer running grooves are likewise constructed parallel to each other in the axial dimension and also include a displacement segment and a functional segment.

16 Claims, 6 Drawing Sheets

SLIDING JOINT

CROSS REFERENCE TO RELATED APPLICATIONS

This application is a continuation of international patent application no. PCT/DE2010/001147, filed Sep. 29, 2010, designating the United States of America and published in German on Apr. 7, 2011 as WO 2011/038719 A1, the entire disclosure of which is incorporated herein by reference. Priority is claimed based on Federal Republic of Germany patent application no. DE 10 2009 043 578.6, filed Sep. 30, 2009, the entire disclosure of which is likewise incorporated herein by reference.

BACKGROUND OF THE INVENTION

The invention relates to a displacement joint or sliding joint for motor vehicles, having an inner race which comprises an inner race axis, first inner running grooves, and second inner running grooves, having an outer race which comprises an outer race axis, first outer running grooves, and second outer running grooves, wherein a first inner running groove and a first outer running groove lie opposite each other and form a first running groove pair, wherein a second inner running groove and a second outer running groove lie opposite each other and form a second running groove pair, having a cage which is constructed with a substantially circular shape and which comprises windows, the number of which corresponds to the number of running groove pairs, wherein the cage is arranged between the inner race and the outer race, and having balls which are guided in the windows of the cage and which engage with the inner running grooves and with the outer running grooves.

Paired-race joints are known in the prior art in various designs, and are disclosed, for example, in U.S. Pat. No. 7,621,816 (=DE 10 2005 042 909) or U.S. Pat. No. 7,396,284 (=DE 10 209 933). These joints are constructed as so-called fixed joints. This means that the design does not include any movement path in the axial dimension, excluding a small amount of axial play. Rather, the articulation point of the joint has a fixed axial position. Some of the known configurations possess the advantage that they have ball races which can be manufactured entirely by means of forming, and therefore can be manufactured in a cost-effective manner.

In addition, joints which can move in the axial dimension, so-called sliding joints, are known in the prior art, e.g. in U.S. Pat. No. 7,530,897 (=DE 10 237 169). In these cases, the joint can make both an articulation and an axial length compensation.

Most of the known configurations of such sliding joints must be manufactured by means of machining due to the geometry of their races. The known configurations which allow manufacture by means of forming are only suitable for a very small angle. They mostly have the disadvantage that the cage cannot be controlled, and can therefore travel into undesired axial positions (e.g. at the end of the race), leading to contacts which disrupt the true running of the device.

U.S. Pat. No. 7,806,772 (=WO 2008/043334) describes a homokinetic sliding joint with an inner and an outer race. Ball raceways are situated in the races, and have a tilted and inclined path with respect to a longitudinal axis of the joint. In this case, the angle of inclination and the angle of tilt have a defined ratio to each other.

Published Japanese patent application no. JP 2007-040425 A discloses a joint, in which the outer races thereof have a path, in sections, which limits the axial movement of the outer and inner races with respect to each other.

SUMMARY OF THE INVENTION

It is an object of the invention to provide a sliding joint which can be manufactured by means of forming and is therefore cost-effective.

Another object of the invention is to provide a sliding joint which additionally makes it possible to form an articulation angle which is needed, for example, in passenger car longitudinal drive shafts or steering assemblies.

These and other objects of the invention are achieved by the invention as described and claimed hereinafter. According to the invention the first inner running grooves and the second inner running grooves are constructed substantially parallel to the inner race axis in the axial dimension, the first inner running grooves and the second inner running grooves each have at least one displacement segment and one functional segment, the first inner running grooves and the second inner running grooves in the displacement segment each have a substantially constant radially measured separation distance from the inner race axis, the first inner running grooves in the functional segment each extend radially away from the inner race axis at a first inner running groove angle, the second inner running grooves in the functional segment are each inclined radially toward the inner race axis at a second inner running groove angle, the first outer running grooves and the second outer running grooves are constructed substantially parallel to the outer race axis in the axial dimension, the first outer running grooves and the second outer running grooves each comprise at least one displacement segment and one functional segment, the first outer running grooves and the second outer running grooves in the displacement segment each have a substantially constant radially measured separation distance from the outer race axis, the first outer running grooves in the functional segment each extend radially away from the inner race axis at a first outer running groove angle, and the second outer running grooves in the functional segment are each inclined radially toward the outer race axis at a second outer running groove angle.

Therefore, in the joint according to the invention the inner and outer running grooves are constructed as straight in the axial dimension, meaning that they are not particularly curved as in the prior art. In addition, the inner and outer running grooves each have a segment with a constant separation distance from each axis, meaning that they extend parallel to their respective longitudinal axes in a straight line. Additionally, the inner and outer running grooves have functional segments which each extend radially away from the respective axis at a particular inclination, or approach the same. The direction, meaning either away from the inner and/or outer race axis, or inward toward the axis, is different for the two types of inner and/or outer running grooves in this case. The balls are situated in this functional region, and the joint carries out its intended function in this functional region.

The running grooves are particularly arranged to be alternating and extend opposed to each other. The cage is preferably radially centered as desired on the inner race or on the outer race, and can move freely in the axial dimension over a wide range. When the inner race is tilted with respect to the outer race, the balls which serve to transmit torque each remain in a common plane which is determined by the cage and which corresponds to the bisecting line of the angle. Due to the alternating raceways extending in opposite directions, both the location of the balls and therefore the location of the cage is a discrete, set position. When the inner race is displaced with respect to the outer race, the balls each remain in a common plane defined by the cage. This plane travels a distance from its origin which is half the distance which the inner race moves with respect to the outer race. When such a movement occurs, a fraction of the balls travels outward radially in the functional region, and a different fraction travels inward radially in the functional region. Due to the alternating raceways extending in opposite directions, both the location of the balls and therefore the location of the cage are discrete, set positions.

The ball raceway areas of the displacement segments, each extending parallel to their respective longitudinal axis, facilitate a greatly enlarged path of travel during installation. This is advantageous when an articulated shaft is assembled by sequenced connection of parts. When the joint part is connected and then subsequently moved back into the base position thereof, the balls, and therefore the ball cage as well, likewise automatically assume their base position. Because these segments are only activated during installation, it is possible to use reduced specifications for manufacturing tolerances in this case (sufficient retraction/ensured free travel). An advantage of the joint according to the invention is its behavior in a crash, wherein the races can move toward each other.

In one embodiment, both the displacement segment and the functional segment of the inner running grooves directly abut each other.

In another embodiment, the segments transition into each other via of rounded transitions.

In a further embodiment, both the displacement segment and the functional segment of the outer running grooves directly abut each other.

In yet another embodiment, the lengths of the functional segments of the first inner running grooves and the second inner running grooves are substantially the same.

In a still further embodiment, the lengths of the functional segments of the first outer running grooves and the second outer running grooves are substantially the same.

In one embodiment, the axial arrangement of the displacement segment and the functional segment of the inner running grooves in each case is the same, proceeding from one end of the inner running grooves. The sequence or progression of the segments of the inner running grooves is therefore the same in each case, proceeding from one end of the inner race.

In another embodiment, the axial arrangement of the displacement segment and the functional segment of the outer running grooves in each case is the same, proceeding from one end of the inner running grooves.

In a further embodiment, a parallel segment connects to the functional segment of the inner running grooves on the side thereof which faces away from the respective displacement segment, and particularly connects directly to the same. In this parallel segment, the inner running grooves have a substantially constant separation distance from the inner race axis, measured radially therefrom. As such, in this third region, the running grooves follow a path on an inner or outer pitch circle, depending on whether the running groove in question is a first or a second running groove, and run in this path in a straight line parallel to the longitudinal axis.

In yet another embodiment, a parallel segment connects to the functional segment of the outer running grooves on the side thereof which faces away from the respective displacement segment, and particularly connects directly to the same. In this parallel segment, the outer running grooves have a substantially constant separation distance from the outer race axis, measured radially therefrom.

In a still further embodiment, at least one inner running groove and/or at least one outer running groove has at least one limit stop which limits a movement of a ball in the axial dimension in the running groove pair which is functionally assigned to the inner running groove and/or the outer running groove.

In one embodiment, the limit stop forms an axial end of the inner running groove and/or the outer running groove.

In another embodiment, the displacement segments each form an axial end of the first inner running groove and/or the second inner running groove.

In a further embodiment, the displacement segments each form an axial end of the first outer running groove and/or the second outer running groove.

In yet another embodiment, the parallel segments each form one axial end of the first inner running grooves and/or the second inner running grooves, whereby this axial end lies opposite the axial end which is formed by the displacement segment.

In a still further embodiment, the parallel segments each form one axial end of the first outer running grooves and/or the second outer running grooves, whereby this axial end lies opposite the axial end which is formed by the displacement segment.

In one embodiment, the first inner running groove angle and the second inner running groove angle are substantially equal in value.

In another embodiment, the first outer running groove angle and the second outer running groove angle are substantially equal in value.

In a further embodiment, the inner running groove angles and the lengths of the functional segments of the inner running grooves are dependent on each other. The angles and the length of the respective functional segments are therefore constructed as dependent on each other. In this case, the manner of this dependency can be accordingly prespecified. In this respect, the individual inner running grooves are either all equal or are constructed differently from each other.

In yet another embodiment, the inner running groove angles and the lengths of the functional segments of the inner running grooves are substantially inversely proportional to each other. As such, in this embodiment, a larger inner running groove angle is associated with a smaller length of the functional segment, and the reverse is also true.

In a still further embodiment, the outer running groove angles and the lengths of the functional segments of the outer running grooves are dependent on each other. As such, in this embodiment, the angle and the length of the functional segment of the outer running grooves are therefore dependent on each other in a prespecified manner.

In one embodiment, the outer running groove angles and the lengths of the functional segments of the inner running grooves are substantially inversely proportional to each other. As such, in this embodiment, the inner running groove angles and the lengths of the functional segments are connected to each other in an opposing relationship.

In another embodiment, the first inner running groove angles and the first outer running groove angles have substantially the same value.

In another embodiment, the second inner running groove angles and the second outer running groove angles have substantially the same value.

In another embodiment, for each of the running groove pairs, the length of the functional segment of the first inner running groove and the length of the functional segment of the associated first outer running groove are substantially the same.

In another embodiment, for each of the running groove pairs, the length of the functional segment of the second inner running groove and the length of the functional segment of the associated second outer running groove are substantially the same.

In one embodiment, the windows of the cage, the balls, the inner raceways, and the outer raceways are constructed in such a manner and are adapted to each other such that the cage also guides the balls even when the balls are situated in the region whereby the functional segments of the inner raceways and the outer raceways have the largest radial separation distance from each other.

The sliding joint according to the invention must be sized in such a manner, with the angle of articulation during operation selected in such a manner, that the balls as a result of their radial movement do not leave the region which is limited by the cage in the axial dimension. At the same time, the permissible sliding paths must be selected in such a manner that the balls do not leave the running groove pair region which is tilted at an angle to the longitudinal axis. In addition, the configuration should comply with both criteria during the combined articulated and sliding movements.

In one embodiment, the windows of the cage, the balls, the inner raceways and the outer raceways are constructed in such a manner and are adapted to each other such that the cage also guides the balls even when the balls are situated in the region in which the functional segments of the inner raceways and the outer raceways have the smallest radial separation distance from each other. As such, the cage is constructed in such a manner that it also withstands, by way of example, the forces which are applied by the races onto the balls.

In one embodiment the clearance between the outer surface and the inner surface of the cage in the region of the windows is constructed in such a manner that the cage guides the balls when the radial separation distance as described above is at its largest and/or its smallest.

In one embodiment, at least one housing is provided which surrounds the outer race and the inner race, at least sectionally.

In another embodiment, the housing and the outer race are coupled to each other in a torque-proof manner.

In a further embodiment, a seal element is situated between the inner race and/or the outer race and the housing.

In yet another embodiment, the seal element is attached on one end region thereof between the outer race and the housing, and the seal element is at least indirectly attached on another end region thereof to the inner race.

In a still further embodiment, the seal element is attached to the inner race by a ring, whereby the ring is arranged inside the interior space enclosed by the seal element and by the housing.

In one embodiment, at least one first inner running groove and at least one second inner running groove are arranged around the inner race axis in an alternating manner.

In one embodiment, a first and a second inner running groove alternate one after the other around the inner race axis.

In a further embodiment, two first inner running grooves and two second inner running grooves in each case are arranged adjacent each other. Different numbers of inner running grooves can also alternate with each other on the inner race.

In another embodiment, at least one first outer running groove and at least one second outer running groove are arranged around the outer race axis in an alternating manner. As such, the different outer running grooves are likewise situated in the outer race in alternating numbers which are either equal or different.

In one embodiment, at least the outer race are comprised partially of metal and partially of a plastic material. The segments of the outer race which carry the functional segments preferably are comprised of a metal, for example steel. They can also be partially hardened. In addition, at least one region of the outer race, which region carries the displacement segments or the parallel segments, preferably is comprised partially or entirely of a plastic material.

In one embodiment, the outer race is constructed substantially in at least three parts, consisting of a portion made of plastic for the displacement segments, an adjacent portion made of a metal for the functional segments, and finally a portion made of a plastic with the parallel segments. The components are, for example, partially inserted into each other, bonded to each other, or locked into each other.

In a further embodiment, the inner race is comprised partially of a metal and partially of a plastic material.

The joint according to the invention can therefore be described as follows: The joint can transmit torque across both an articulation and an axial sliding region. By specific selection of the construction parameters, a joint having a large articulation angle and/or a large sliding path can be realized, depending on the application. The articulation angle and the length of the sliding path in a given embodiment are in this case particularly connected to each other in an inverse relationship. The displacement segments can also be described as regions with straight raceways, meaning raceways which are parallel to the primary axis of the joint.

The functional segments can be described as regions with a conical raceway path, meaning a path which is tilted in a direction running opposite the primary axis of the joint. In this case, the primary axis of the joint is the axis wherein the inner race axis and the outer race axis coincide when the joint is not articulated. In the inner part of the joint and/or in the inner race, the displacement segments in this case are arranged on the end of the running groove pair, whereby the end faces the inner half shaft of the joint. In the outer race, the displacement segments are arranged on the end of the running groove pair wherein said end faces away from the inner half shaft of the joint. This means that the displacement segments lie opposite each other in the axial dimension. The displacement segments can be substantially considered as installation regions. They enable the joint to be compressed for the purpose of installation to a significantly reduced length compared to the length of the joint when installed for operation. The long compression path simplifies assembly of an articulated shaft, particularly with pivot connections. In this case, the shaft can be sufficiently shortened to be threaded in between the pivot points. Subsequently, the shaft can be expanded again to be placed on the pivot(s).

In one variant, the running groove pairs continue on both sides of the functional segment as raceways with a straight raceway path, meaning the configuration includes displacement segments and parallel segments. Additionally, limit stops can be included abutting the sliding and/or parallel segments as components of the running groove pairs, for the purpose of limiting the path of the balls. The running groove pairs are therefore subdivided into two groups.

In one case, the inclination of the grooves in the functional segment in the inner race is such that the groove ends on a small pitch circle on the end thereof which faces the inner half shaft of the joint, and the groove ends on a large pitch circle on the end thereof which faces away from the inner half shaft of the joint. The inclination of the groove in the functional segment in the outer race is such that the groove ends on a large pitch circle on the end thereof which faces the inner half shaft of the joint, and the groove ends on a small pitch circle on the end thereof which faces away from the inner half shaft of the joint.

In a different configuration, the inclination of the grooves in the functional segment in the inner race is such that the groove ends on a large pitch circle on the end thereof which faces the inner half shaft of the joint, and the groove ends on a small pitch circle on the end thereof which faces away from the inner half shaft of the joint. The inclination of the groove in the functional segment in the outer race is such that the groove ends on a small pitch circle on the end thereof which faces the inner half shaft of the joint, and the groove ends on a large pitch circle on the end thereof which faces away from the inner half shaft of the joint. The grooves of one group are each without an undercut (both in the outer race and the inner race), and as such can be easily manufactured by forming. The regions with straight grooves—that is, in the sliding or parallel segment—can be selected in a relatively "open" manner with respect to their manufacturing tolerances, because these segments do not serve to guide the balls during actual use, meaning when fully installed. In particular, the tolerances in these regions can be selected in such a manner that in this region a degree of separation distance exists upon assembly which enables a further reduced axial force during installation.

In one embodiment, the cage is preferably guided radially in the outer race. In another embodiment, the cage is particularly not guided on the inner race. In addition, the cage is preferably free in the axial dimension with respect to the outer race and with respect to the inner race.

In one embodiment, the cage can comprise an outer contour which is spherical in the center region, whereby axial guidance is preserved even when the cage is tilted. The outer contour of the cage can comprise cylindrical regions which connect to the spherical region in both directions. These regions can serve to limit the articulation. If the joint is used in such a manner that the balls are situated in the functional segment, the axial forces applied to the cage then nearly cancel each other out. The cancellation of the forces is not perfect, but rather occurs in a good approximation. The forces applied to the balls always steer the cage at a pivot angle which corresponds to half the angle of articulation. The transition between the segments of a groove can particularly be rounded.

The outer race can be accommodated in a housing in such a manner that the axial paths of the balls in the running groove pairs of the joint outer race are limited by the housing. In this case, the limitation can be applied only to the balls in one group of raceways in certain circumstances. However, the axial limitation of the movement of the other balls necessarily results due to the coupling of the axial movement of the balls via the ball cage. This variant is therefore an alternative or a complement to the embodiment wherein the grooves are constructed approaching the ends thereof in such a manner that they lead to a limitation of the axial movement of the balls, meaning that they themselves comprise a limit stop. The limitation of the axial path in this case can be designed in such a manner that it can be realized by a forming process during manufacture. The limitation of the axial path can optionally be deployed only on the grooves of one raceway group, or only on a single groove. If especially small axial path limits are used, and/or by means of leaving out the same, an especially low-force sliding joint can be created. In this manner, the articulated shaft can be compressed at this point in the event of a crash without large forces and/or a large application of energy.

BRIEF DESCRIPTION OF THE DRAWINGS

The invention will be described in further detail hereinafter with reference to illustrative embodiments shown in the accompanying drawing figures, in which:

FIGS. 3a) and b) show cutaway views of two embodiments of the joint according to the invention;

DETAILED DESCRIPTION OF ILLUSTRATIVE EMBODIMENTS

Figure 1:
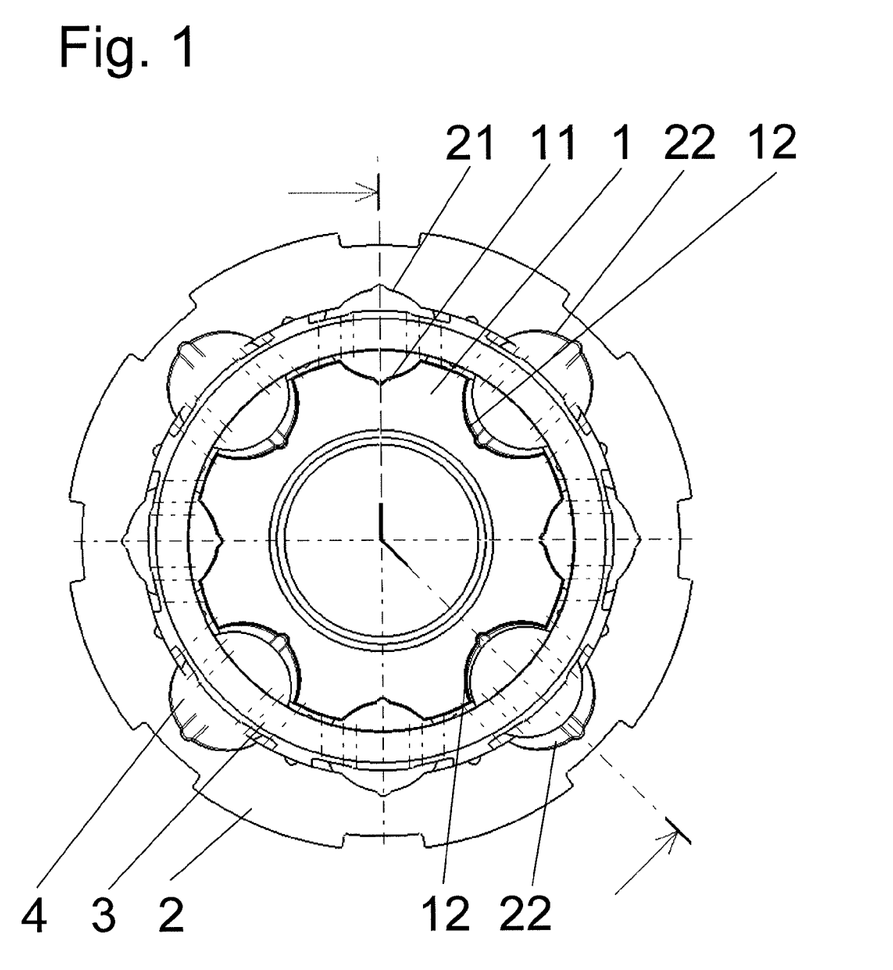
FIG. 1 shows a cutaway view of a joint according to the invention.

FIG. 1 shows a cutaway view of a sliding joint according to the invention. The figure shows the inner race 1 with the total of eight inner running grooves, wherein the latter consist of four first inner running grooves 11 and four second inner running grooves 12, arranged around the inner race axis—meaning the longitudinal axis of the inner race—in an alternating manner. The outer running grooves 21, 22 are situated opposite the inner running grooves 11, 12, wherein the inner running grooves and their associated outer running grooves each form running groove pairs. The eight outer running grooves are formed by four first outer running grooves 21 and four second outer running grooves 22 which are arranged alternating about the outer race axis. As such, first inner running grooves are functionally associated with first outer running grooves, and second inner running grooves are functionally associated with second outer running grooves. In addition, the figure shows that first inner running grooves 11 in this embodiment lie opposite each other on the inner race 1. Accordingly, the same applies for the second inner running grooves, and/or for the outer running grooves. The inner and outer running grooves are all constructed in such a manner that they run in a straight line axially in the direction of the race axis assigned to them, meaning that they run parallel to the race axes. However, the individual running groove pairs narrow and/or expand toward or away from the radial center, meaning that their separation distance from the race axes changes, although the running grooves remain straight in the direction of the race axes and perpendicular to the change in the radial direction, and do not deviate, for example laterally, from their respective race axes. One ball 4 is provided in each of the running groove pairs. The balls 4 are situated in the windows of a circular cage 3 which holds them in a plane. This variant includes eight pairs of running grooves. However, the configuration can include other, even or odd, numbers as well, which are optionally whole number multiples of four, or are not. As such, two pairs of running grooves of the same type can also alternate with two other pairs.

Figure 2:
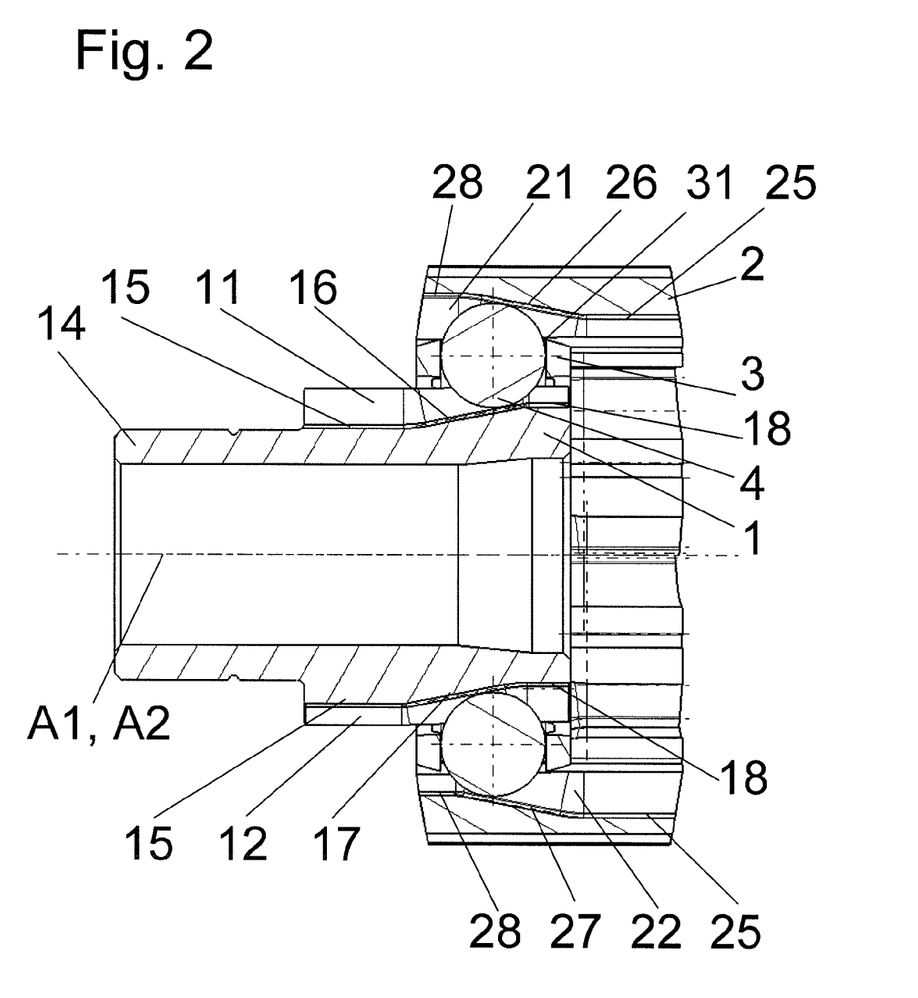
FIG. 2 shows a cutaway view of a joint in FIG. 1.

The cutaway view in FIG. 2 shows a plane through the joint in FIG. 1, as indicated in FIG. 1, transecting two different pairs of running grooves. A first inner running groove 11 and a first outer running groove 21 are situated above, and a second inner running groove 12 and a second outer running groove 22 are situated below. The first inner running groove 11 has a displacement segment 15 on one of its ends, and this displacement segment 15 is constructed in such a manner that the groove in this region has a substantially constant separation distance from the inner race axis A1, meaning that the groove 11 runs parallel to the inner race axis A1 in this displacement segment 15. A functional segment 16 joins with the displacement segment 15. The articulation of the joint takes place in this functional segment 16. In the functional segment 16, the inner running groove 11 is inclined at a first inner running groove angle away from the inner race axis A1, meaning that the inner running groove 11 extends away from the inner race axis A1 in this region. In this embodiment, a parallel segment 18 joins with the functional segment 16, and the inner running groove 11 once again runs parallel to the inner race axis A1 in this parallel segment 18, and therefore with a constant separation distance from the same. Because of the path of the functional segments 16, however, this separation distance is larger than the separation distance of the displacement segment 15. The first outer running groove 21 of the outer race 2 likewise has a displacement segment 25 in which the outer running groove 21 is guided parallel to the outer race axis A2, and therefore is guided with a constant separation distance to the same. A functional segment 26 is included in the running groove 21 after the displacement segment 25, and in this functional segment 26 the outer running groove 21 extends away from the outer race axis A2 at a first outer running groove angle. The first inner running groove 11 and the first outer running groove 21 therefore both extend away from their respective race axes A1, A2 in the respective functional segment 16, 26—in each case as observed proceeding from the respective displacement segment in the direction of the respective functional segment. If the path of the grooves is observed in this case proceeding from the left side, meaning from the inner half shaft 14 of the joint, then the first inner running groove 11 extends away from the longitudinal axis of the joint in the functional segment 16, and the outer running groove 21 extends toward the longitudinal axis of the joint in the functional segment 26. After the functional segment 26, the outer running groove 21 once again has a path with a constant separation distance from the outer race axis A2 in the parallel segment 28. The displacement segment 15 of the second inner running groove 12 lies parallel to the displacement segment 15 of the first inner running groove 12, and also starts on the same side with respect to the axial dimension. The same applies for the parallel segment 18. The difference between the first 11 and the second inner running groove 12 is found in the region of the functional segments 16, 17, wherein the second inner running groove 12 approaches the inner race axis A1 in the functional segment 17. The second outer running groove 22 is constructed in such a manner that it extends toward the outer race axis A2 at a second outer running groove angle proceeding from its displacement segment 25, in its functional segment 27. Otherwise, the second outer running groove 22 has a corresponding design to that of the first outer running groove 21. The second inner running groove 12 extends toward the inner race axis A1 from the inner half shaft 14 of the joint in the functional segment 17, and the second outer running groove 22 extends away from the outer race axis A2 in its functional segment 27, wherein in the embodiment shown here, the inner race axis A1 and the outer race axis A2, and the longitudinal axis of the joint coincide. As such, the running groove pairs each have two segments in which at least one running groove—the inner and/or outer running groove—has a straight path with a constant separation distance from the respective axis. The installation of the joint, for example, can be carried out via these segments. As such, this configuration can also lead to the result that during the manufacture of these segments, less precision is required than in the case of the functional segments. In the functional segments, the individual running grooves are each inclined radially inward, thereby producing a separation distance and/or a narrowing of the running groove pairs. The displacement segments 15 of the inner running grooves 11, 12 are situated in this variant on the side of the inner half shaft 14 of the joint, and the displacement segments 25 of the outer running grooves 21, 22 are situated on the side which faces away from the inner half shaft 14 of the joint. These straight segments 15, 25 therefore lie opposite each other with respect to the axial dimension defined by the longitudinal axis of the joint. In the embodiment of the joint shown here, and in the orientation thereof which is not tilted in this case, the inner race axis A1 and the outer race axis A2 coincide, and therefore make up the longitudinal axis of the joint. The transitions between the individual regions of the raceways in this case are preferably even, for example via rounded segments.

Figure 3:
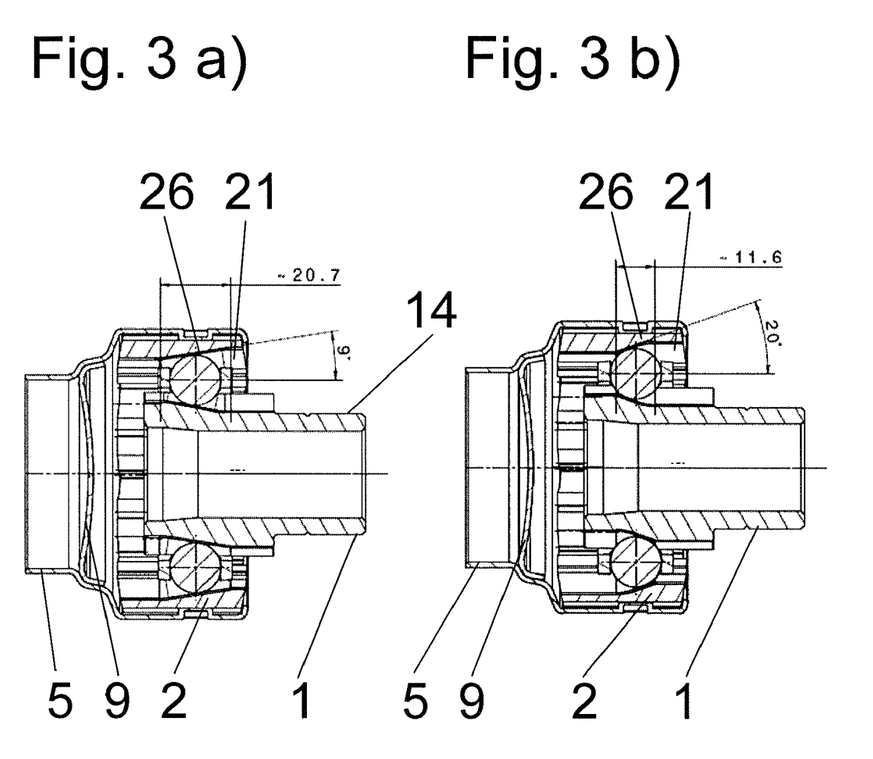

FIGS. 3 a) and 3 b) clarify the relationship between the angles of inclination of the running grooves relative to the respective axis in the region of the functional segments and the length of the functional segments, using two examples. The outer running groove angle of the first outer running groove 21 of the joint in FIG. 3 a) is larger than the outer running groove angle of the joint in FIG. 3 b). In contrast, the length of the functional segment 26 of the joint in FIG. 3 a) is larger than the length of the functional segment 26 of the joint in FIG. 3 b). The corresponding relationship also applies for the functional segments of the other running grooves. It can also be seen that the inner race 1 and the outer race 2 are entirely or partially accommodated in a housing 5. The outer race 2 and the housing 5 in this case are connected to each other in a torque-proof manner. A cover 9 is included in the configuration in front of the inner race 1, opposite the inner half shaft 14 of the joint. This cover 9 seals the joint, for example in cooperation with the seal element described below. In addition, the cover 9 serves as a limit stop for the inner race 1 in the event of a crash. The force required to punch through the cover can be set by means of the cover thickness and geometry. In a further variant—not illustrated here—the joint is constructed with a flange for the purpose of direct or at least indirect attachment on the housing or on the outer part of the joint, meaning on the outer race.

Figure 4:
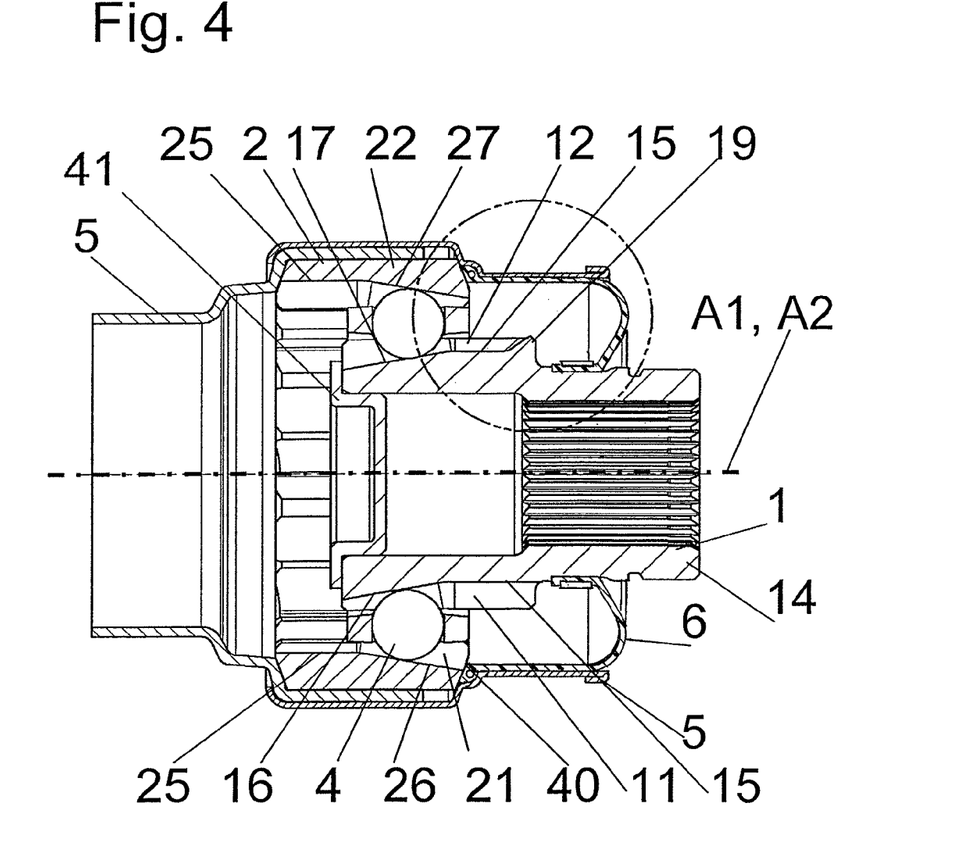
FIG. 4 shows a cutaway view of a further embodiment of the joint according to the invention.

FIG. 4 shows a further variant of the joint according to the invention. In this embodiment, the first inner running groove 11 and the first outer running groove 21 are situated below, and the second inner running groove 12 and the second outer running groove 22 are illustrated above. The second inner running groove 12 has a displacement segment 15 which has a limit stop 19 on one end thereof. The limit stop 19 projects into its running groove pair, and therefore limits the path of the ball 4 in this running groove pair. The path of the ball in the second inner running groove 12 is also further restricted in this embodiment by means of a plug 41, which is attached in a recess on the end face of the inner race 1, and which is constructed in such a manner that it projects outward sufficiently far to form an end stop, at least of one inner running groove 12, for the ball 4. The functional region 17 joins with the displacement segment 15, and is inclined toward the inner race axis A1. In this embodiment, the displacement segments 15, 25 each form one end of the associated running grooves 11, 12, 21, 22. The other ends were formed in the embodiments shown in FIG. 1 to FIG. 3 by the parallel segments 18, 28. In this case, the running grooves 11, 12, 21, 22 end in the functional segments 16, 17, 26, 27. In the case of the running groove pair made of the first inner running groove 11 and the first outer running groove 21—visible in this case below—the path of the ball is limited by, for example, a seal element 6 which is constructed in such a manner and is arranged between the housing 5 and the outer race 2 such that it is situated at the end of the outer race 2, and therefore closes the outer running groove 21, the same reaching to the end, on the edge of the limit stop 40. The inner race 1 in this case has a splining on the inner half shaft 14 of the joint, for the purpose of connection to a shaft. A securing ring, by way of example, is provided for the connection to the shaft, or a coupling nut is used in cooperation with a corresponding outer contour. The inner race 1 and the outer race 2 are surrounded by a housing 5. On the side facing the inner race 1, the housing is closed by a seal element 6.

Figure 5:
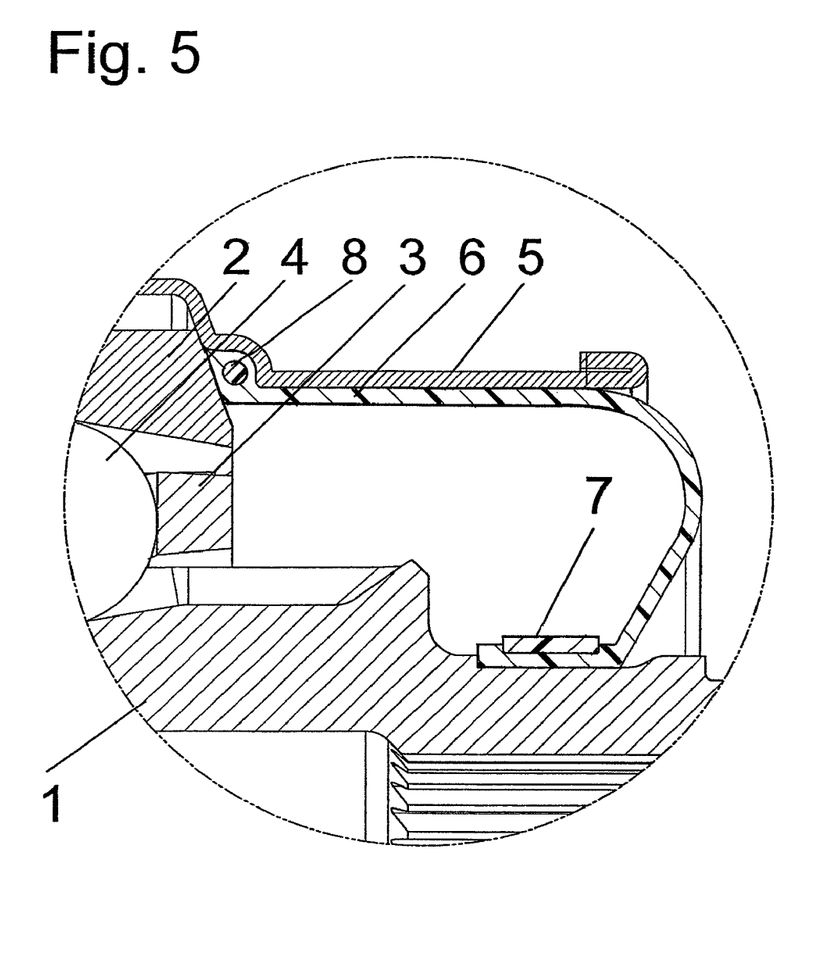
FIG. 5 shows an enlarged section of FIG. 4.

The connection between the seal element 6 and both of the races 1, 2 is illustrated in the enlarged section of FIG. 5. On one end, the seal element 6 is attached between the housing 5 and the outer race 2. On the other end, the seal element 6 is fixed on the inner race 1 by means of a ring, wherein the ring 7 is situated in an interior space which is created by the housing 5 and the two races 1, 2. The seal element 6 in this case also includes a reinforcing ring 8 which is arranged in the transition region between the housing 5 and the outer race 2.

Figure 6:
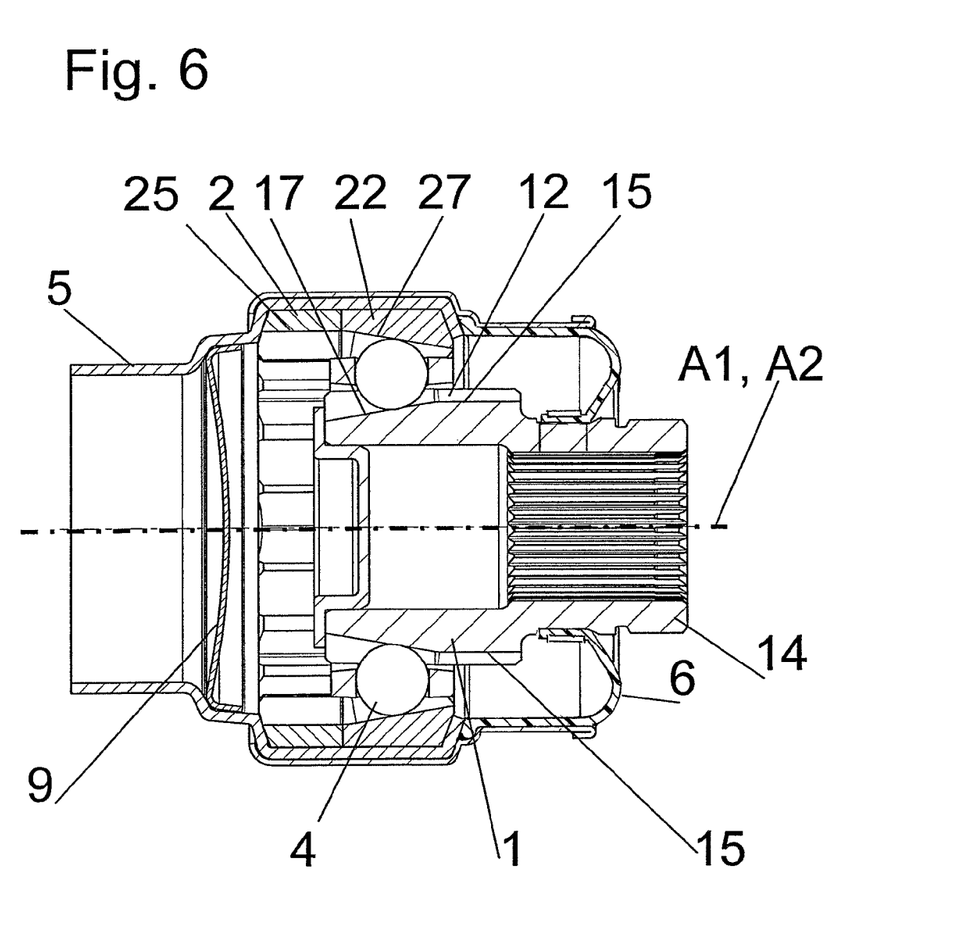
FIG. 6 shows a cutaway view of an additional embodiment of the joint according to the invention.

In the variant of the joint shown in FIG. 6, the outer race 2 is comprised of two components. As an alternative, the configuration can also include multiple components and/or the inner race 1 can also be constructed of multiple parts. The section which supports the functional segment 27 in this case is made of a metal, for example steel. The section in which the displacement segment 25 is situated is made of a plastic material. The regions of the outer running grooves 22 which are subjected to a load are therefore housed in load-bearing metal, and the segments which are only relevant substantially during the installation of the joint, are made of a plastic material, for example for the purpose of saving weight. The outer race 2 in this case is surrounded by the housing 5 in such a manner that the components thereof are held together.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A sliding joint for a motor vehicle comprising:
   an inner race with an inner race axis, first inner running grooves and second inner running grooves;
   an outer race with an outer race axis, first outer running grooves and second outer running grooves;
   one first inner running groove and one first outer running groove being disposed opposite each other and together forming a first running groove pair;
   one second inner running groove and one second outer running groove being disposed opposite each other and together forming a second running groove pair;
   a substantially circularly shaped cage arranged between the inner race and the outer race, said cage having a number of windows corresponding to the number of running groove pairs, and
   balls which are guided in the windows of the cage and which engage in the inner running grooves and the outer running grooves,
   wherein
      the first inner running grooves and the second inner running grooves are constructed to run substantially parallel to the inner race axis in the axial dimension;
      the first inner running grooves and the second inner running grooves each have at least one displacement segment and one functional segment;
      the first inner running grooves and the second inner running grooves each have a substantially constant separation distance from the inner race axis in the displacement segment, measured radially therefrom;
      the first inner running grooves each extend radially outward from the inner race axis at a first inner running groove angle in the functional segment;
      the second inner running grooves each incline at a second inner running groove angle radially toward the inner race axis in the functional segment;
      the first outer running grooves and the second outer running grooves are constructed substantially parallel to the outer race axis in the axial dimension;
      the first outer running grooves and the second outer running grooves each have at least one displacement segment and one functional segment;
      the first outer running grooves and the second outer running grooves each have a substantially constant separation distance from the outer race axis in the displacement segment;
      the first outer running grooves each extend away from the outer race axis radially at a first outer running groove angle in the functional segment,
      the second outer running grooves each incline at a second outer running groove angle radially toward the outer race axis in the functional segment,
      said first inner running groove angle and the length of said functional segments of said first inner running grooves are substantially inversely proportional to each other,
      said second inner running groove angle and the length of said functional segments of said second inner running grooves are substantially inversely proportional to each other,
      said first outer running groove angle and the length of said functional segments of said first outer running grooves are substantially inversely proportional to each other, and
      said second outer running groove angle and the length of said functional segments of said second outer running grooves are substantially inversely proportional to each other.

2. A sliding joint according to claim 1, wherein both the displacement segment and the functional segment of the inner running grooves directly abut each other.

3. A sliding joint according to claim 1, wherein both the displacement segment and the functional segment of the outer running grooves directly abut each other.

4. A sliding joint according to claim 1, wherein one parallel segment joins with each of the functional segments of the inner running grooves on the side which faces away from the respective displacement segment, and in this parallel segment the inner running grooves have a substantially constant separation distance from the inner race axis, measured radially from said inner race axis.

5. A sliding joint according to claim 1, wherein one parallel segment joins with each of the functional segments of the outer running grooves on the side thereof which faces away from the respective displacement segment, and in this parallel segment the outer running grooves have a substantially constant separation distance from the outer race axis, measured radially from said outer race axis.

6. A sliding joint according to claim 1, wherein at least one inner running groove and/or at least one outer running groove has at least one limit stop which limits axial movement of a ball in the running groove pair comprised of the inner running groove and the outer running groove.

7. A sliding joint according to claim 1, wherein the first inner running groove angle and the second inner running groove angle have substantially the same value.

8. A sliding joint according to claim 1, wherein the first outer running groove angle and the second outer running groove angle have substantially the same value.

9. A sliding joint according to claim 1, wherein the first inner running groove angle and the first outer running groove angle have substantially the same value.

10. A sliding joint according to claim 1, wherein the second inner running groove angle and the second outer running groove angle have substantially the same value.

11. A sliding joint according to claim 1, wherein for each of the running groove pairs, the length of the functional segment of the first inner running groove and the length of the functional segment of the associated first outer running groove are substantially equal.

12. A sliding joint according to claim 1, wherein for each of the running groove pairs, the length of the functional segment of the second inner running groove and the length of the functional segment of the associated second outer running groove are substantially equal.

13. A sliding joint according to claim 1, wherein the windows of the cage, the balls, the inner raceways and the outer raceways are constructed in such a manner and correspond to each other such that the cage also guides the balls even when the balls are situated in the region wherein the functional segments of the inner raceways and the outer raceways have the largest radial separation distance from each other.

14. A sliding joint according to claim 1, wherein the windows of the cage, the balls, the inner raceways and the outer raceways are constructed in such a manner and correspond to each other such that the cage also guides the balls even when the balls are situated in the region wherein the functional segments of the inner raceways and the outer raceways have the smallest radial separation distance from each other.

15. A sliding joint according to claim 1, wherein at least the outer race is comprised partially of a metal and partially of a plastic material.

16. A sliding joint according to claim 15, wherein the section of the outer race carrying said functional segments is made of a metal and the section of the outer race carrying said displacement segments is made of a plastic material.

* * * * *